Oct. 26, 1937.   V. R. HON   2,097,371
EYEGLASS CLASP
Filed Sept. 28, 1936

Victor R. Hon  INVENTOR
BY Victor J. Evans & Co.
ATTORNEYS

Patented Oct. 26, 1937

2,097,371

UNITED STATES PATENT OFFICE 2,097,371

EYEGLASS CLASP

Victor R. Hon, Deming, N. Mex.

Application September 28, 1936, Serial No. 103,010

1 Claim. (Cl. 88—52)

The invention relates to an eyeglass clasp and more especially to clasps for use on the temple bars and frames of spectacles or eyeglasses.

The primary object of the invention is the provision of a clasp of this character, which in its construction and arrangement is a refinement on the subject matter of Letters Patent No. 2,042,400 issued on or about May 26, 1936, wherein at the hinge connection of the temple bar to the eyeglass frame or spectacles the clasp is present to enable the eyeglasses to be safely carried within the pocket of a user and when in the pocket will be attached or clamped to the garment to avoid the possibility of the dropping of the glasses from the person.

Another object of the invention is the provision of a clasp of this character, wherein the same constitutes a part of the hinge connecting the temple bar with the frame of eyeglasses and does not interfere with the folding or unfolding of the temple bar and will enable the fastening of the glasses within the pocket of a garment for safe keeping of such glasses.

A further object of the invention is the provision of a clasp of this character, which is simple in construction, convenient for use, assuring safety to the glasses when within the pocket of a garment of a user, strong, durable, and inexpensive to manufacture and install.

With these and other objects in view, the invention consists in the features of construction, combination and arrangements of parts as will be hereinafter more fully described, illustrated in the accompanying drawing, which discloses the preferred embodiment of the invention and pointed out in the claim hereunto appended.

In the accompanying drawing.

Similar reference characters indicate corresponding parts throughout the several views in the drawing.

Figure 1:
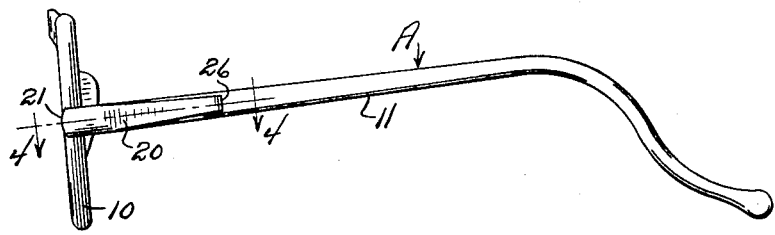
Figure 1 is a side elevation of eyeglasses showing the glasses constructed in accordance with the invention applied.
Figure 2:
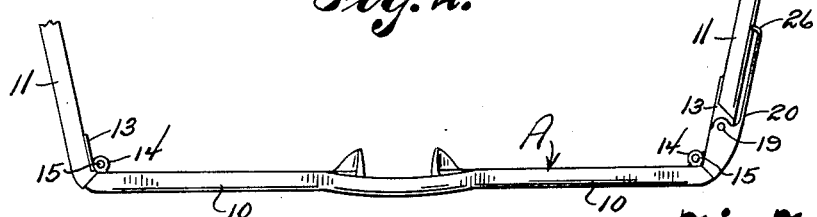
Figure 2 is a fragmentary top plan view.
Figure 3:
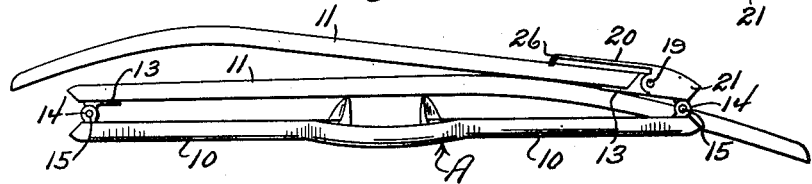
Figure 3 is a top plan view showing the temple bars folded.
Figure 7:
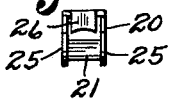
Figure 7 is an end view of the clasp shown in Figure 6.
Figure 4:
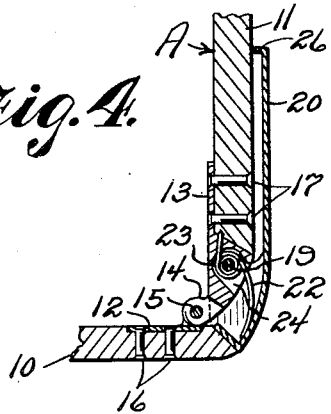
Figure 4 is an enlarged fragmentary longitudinal sectional view through one temple bar and showing the clasp in section applied thereto.
Figure 5:
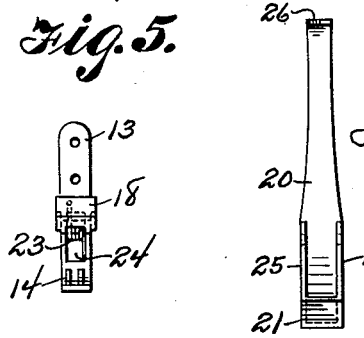
Figure 5 is an edge elevation of the hinge with the clasp removed.
Figure 6:
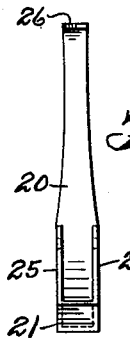
Figure 6 is a plan view of the clasp detached from the hinge of the eyeglasses.

Referring to the drawing in detail, A designates generally spectacles, these being of the conventional type having a frame 10 for the glasses or lenses common in kind and to this frame are hingedly connected the temple bars 11, the hinge for each bar including the leaf pieces 12 and 13, respectively, formed with pintle eyes 14 for the pivot or hinge pintle 15, the piece 12 being riveted at 16 to the frame while the piece 13 is riveted at 17 to the temple bar.

The piece 13 is formed with a bearing 18 for accommodating a pivot 19 swingingly connecting a jaw 20 in place upon the said piece 13 and this jaw constitutes the clasp, it having a channeled heel end 21 accommodating the end 22 of a coiled spring 23, the other end being made secure to the temple bar and such spring is coiled about the pivot 19 and concealed within a cavity 24 therefor as provided in the piece 13.

The heel end 21 of the clasp 20 has side walls 25 bent therefrom and between which is held the end 22 of the spring 23, the latter functioning to exert tension upon the clasp 20, which at its toe end is provided with a nib or claw 26 at right angles to said jaw. This nib or claw 26 clips the fabric of a garment when the temple bars have been folded and the eyeglasses or spectacles placed within a pocket of such garment so that the clasp will make secure the glasses or spectacles within the pocket to avoid accidental dropping of the glasses from the person or the loss of such glasses or spectacles when not in use.

What is claimed is:

In spectacles, a frame, a temple bar at each end of the frame, a hinge including leaf parts secured respectively to the frame and the temple bar, a bearing formed on the part of one hinge connected to the temple bar and having an outwardly opening recess, a jaw at the outer side of the temple bar and having a channeled heeled end, a pivot movably mounting the jaw on the bearing and passed through the recess therein, a tensioning spring coiled about the pivot within the recess for concealment within the bearing and engaged in the heel end of the jaw and said bearing, respectively, for activity of the said jaw in conjunction with the temple bar for the clamping of the said temple bar with a garment, side walls formed on the heel end of the jaw, an end wall at the channeled heel end of the jaw and forming an abutment with the frame for limiting the throw of the temple bar, and a claw on the toe end of said jaw.

VICTOR R. HON.